US012633128B2

(12) United States Patent
Park et al.

(10) Patent No.: US 12,633,128 B2
(45) Date of Patent: May 19, 2026

(54) SYSTEMS AND METHODS FOR TARGET ASSIGNMENT FOR END-TO-END THREE-DIMENSIONAL (3D) DETECTION

(71) Applicant: TOYOTA RESEARCH INSTITUTE, INC., Los Altos, CA (US)

(72) Inventors: Dennis Park, Fremont, CA (US); Jie Li, Los Altos, CA (US); Dian Chen, Los Altos, CA (US); Vitor Guizilini, Santa Clara, CA (US); Adrien D. Gaidon, Los Altos, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 495 days.

(21) Appl. No.: 18/159,670

(22) Filed: Jan. 25, 2023

(65) Prior Publication Data

US 2024/0249531 A1 Jul. 25, 2024

(51) Int. Cl.
*G06V 20/58* (2022.01)
*B60W 60/00* (2020.01)

(52) U.S. Cl.
CPC .......... *G06V 20/58* (2022.01); *B60W 60/001* (2020.02); *B60W 2420/403* (2013.01)

(58) Field of Classification Search
CPC ................ G06V 20/58; B60W 60/001; B60W 2420/403
See application file for complete search history.

(56) References Cited

U.S. PATENT DOCUMENTS

| | | | | | |
|---|---|---|---|---|---|
| 10,816,992 B2 * | 10/2020 | Chen | ...................... | G06N 20/00 |
| 10,937,178 B1 * | 3/2021 | Srinivasan | .............. | G06T 7/521 |

(Continued)

FOREIGN PATENT DOCUMENTS

| | | | | |
|---|---|---|---|---|
| CN | 108171217 | 6/2018 | | |
| DE | 112020002764 T5 * | 4/2022 | .............. | G08G 1/04 |

(Continued)

OTHER PUBLICATIONS

Du et al., "Overview of Two-Stage Object Detection Algorithms," 5th International Conference on Intelligent Computing and Signal Processing (ICSP), Mar. 2020, pp. 1-6 (https://iopscience.iop.org/article/10.1088/1742-6596/1544/1/012033).

(Continued)

*Primary Examiner* — Pinalben Patel
(74) *Attorney, Agent, or Firm* — SHEPPARD, MULLIN, RICHTER & HAMPTON LLP; Daniel N. Yannuzzi

(57) ABSTRACT

Systems and methods for enhanced end-to-end three-dimensional (3-D) object detection are disclosed that improve detecting objects in the 3D space from images, such as monocular camera image that may be captured during the operation the autonomous vehicles. For example, a vehicle can include a processor device detecting one or more objects in a 3D space by predicting 3D bounding boxes and predicting dense depth associated with target assignments. The target assignments correspond to the location of objects within an image of the 3D space of a surrounding environment for the vehicle. The vehicle can also include a controller device that receives the detection of the objects in the 3D space from the processor device and performs autonomous operations. The end-to-end 3D object detection techniques achieve a high level of object detection accuracy, with significant improvements compared to previous meth- (Continued)

ods, due to the simplicity and optimization of its end-to-end functionality.

26 Claims, 7 Drawing Sheets

(56)                References Cited

U.S. PATENT DOCUMENTS

| | | | |
|---|---|---|---|
| 2020/0294257 A1* | 9/2020 | Yoo | G06N 3/084 |
| 2021/0026355 A1* | 1/2021 | Chen | G01S 17/89 |
| 2022/0020175 A1 | 1/2022 | Wang | |
| 2022/0114888 A1* | 4/2022 | Napanda | G06V 20/584 |
| 2023/0161352 A1* | 5/2023 | Sun | G01C 21/005 |
| | | | 701/26 |
| 2023/0166733 A1* | 6/2023 | Sajjadi Mohammadabadi | B60W 30/095 |
| | | | 382/104 |

FOREIGN PATENT DOCUMENTS

| | | | | |
|---|---|---|---|---|
| GB | 2628944 A | * | 10/2024 | .......... B60W 30/162 |
| WO | 2022045429 | | 3/2022 | |

OTHER PUBLICATIONS

Xu et al., "PointFusion: Deep Sensor Fusion for 3D Bounding Box Estimation," 2018 IEEE/CVF Conference on Computer Vision and Pattern Recognition, Jun. 19, 2018, pp. 244-253 (https://openaccess.thecvf.com/content_cvpr_2018/papers/Xu_PointFusion_Deep_Sensor_CVPR_2018_paper.pdf).

Liu et al., "Dynamic Anchor: A Feature-Guided Anchor Strategy for Object Detection," Applied Sciences, 12 (10):4897-4914, May 12, 2022 (https://doi.org/10.3390/app12104897).

Chen et al., "Learning Joint 2D-3D Representations for Depth Completion," 2019 IEEE/CVF International Conference on Computer Vision (ICCV), Nov. 1, 2019, pp. 10023-10032 (https://openaccess.thecvf.com/content_ICCV_2019/papers/Chen_Learning_Joint_2D-3D_Representations_for_Depth_Completion_ICCV_2019_paper.pdf).

Murhij et al., "Real-time 3D Object Detection using Feature Map Flow," Jun. 26, 2021, 4 pages (https://arxiv.org/abs/2106.14101).

* cited by examiner

600

PROCESSOR 604

MEMORY
608

STORAGE DEVICES
610

MEDIA DRIVE
612

MEDIA
614

STORAGE
UNIT I/F
620

STORAGE
UNIT
622

BUS
602

COMM I/F
624

CHANNEL 628

SYSTEMS AND METHODS FOR TARGET ASSIGNMENT FOR END-TO-END THREE-DIMENSIONAL (3D) DETECTION

TECHNICAL FIELD

The present disclosure relates to systems and methods supporting enhanced computer vision capabilities which may be applicable to autonomous vehicle operation, for example providing end-to-end three-dimensional (3D) object detection.

BACKGROUND

Computer vision is a technology that involves techniques which enable computers to gain high-level understanding from digital images and/or videos. For example, a computer system that is executing computer vision can autonomously perform various acquisition, processing, and analysis tasks using digital images and/or video, thereby extracting high-dimensional data from the real-world. There are several different types of technologies that fall under the larger umbrella of computer vision, including: depth synthesis; depth estimation; scene reconstruction; object detection; event detection; video tracking; three-dimensional (3D) pose estimation; 3D scene modeling; motion estimation; and the like.

Computer vision is also at the core of autonomous vehicle technology. For instance, autonomous vehicles can employ computer vision capabilities and leverage object detection algorithms in combination with advanced cameras and sensors to analyze their surroundings in real-time. Accordingly, by utilizing computer vision, autonomous vehicles can recognize objects and surroundings (e.g., pedestrians, road signs, barriers, and other vehicles) in order to safely navigate the road. Continuing advancements in vehicle cameras, computer vision, and Artificial Intelligence (AI) have brought autonomous vehicles closer than ever to meeting safety standards, earning public acceptance, and achieving commercial availability. Moreover, recent years have witnessed enormous progress in AI, causing AI-related fields such as computer vision, machine learning (ML), and autonomous vehicles to similarly become rapidly growing fields.

BRIEF SUMMARY OF EMBODIMENTS

According to various embodiments in the disclosed technology, a vehicle can include a processor device detecting one or more objects in a three-dimensional (3D) space by predicting 3D bounding boxes and predicting dense depth associated with one or more target assignments. The one or more are target assignments correspond to the location of the one or more objects within an image of the 3D space of a surrounding environment for the vehicle. The vehicle can also include a controller device receiving the detection of the one or more objects in the 3D space from the processor device and performing one or more autonomous operations.

According to another embodiment in the disclosed technology, a system can include a backbone neural network component extracting features associated with one or more objects in an image of a three-dimensional (3D) space. The system can also include a 3D detection component predicting 3D bounding boxes and predicting dense depth associated with the one or more objects in a 3D space, wherein the 3D bounding boxes are predicted based on the features and correspond to the location of the one or more objects within the image of the 3D space.

According to yet another embodiment in the disclosed technology, a non-transitory computer-readable medium having executable instructions stored thereon that, when executed by a processor, perform the operations of: extracting features associated with one or more objects in an image of a three-dimensional (3D) space. Additionally, the non-transitory computer-readable medium having executable instructions stored thereon that, when executed by a processor, further performs the operations of: predicting 3D bounding boxes and predicting dense depth associated with the one or more objects in a three-dimensional (3D) space, wherein the 3D bounding boxes are predicted based on the features and correspond to the location of the one or more objects within the image of the 3D space.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The technology disclosed herein, in accordance with one or more various implementations, is described in detail with reference to the following figures. The figures are provided for purposes of illustration only and merely depict typical or example implementations of the disclosed technology. These figures are provided to facilitate the reader's understanding of the disclosed technology and shall not be considered limiting of the breadth, scope, or applicability thereof. It should be noted that for clarity and ease of illustration these figures are not necessarily made to scale.

Figure 1:
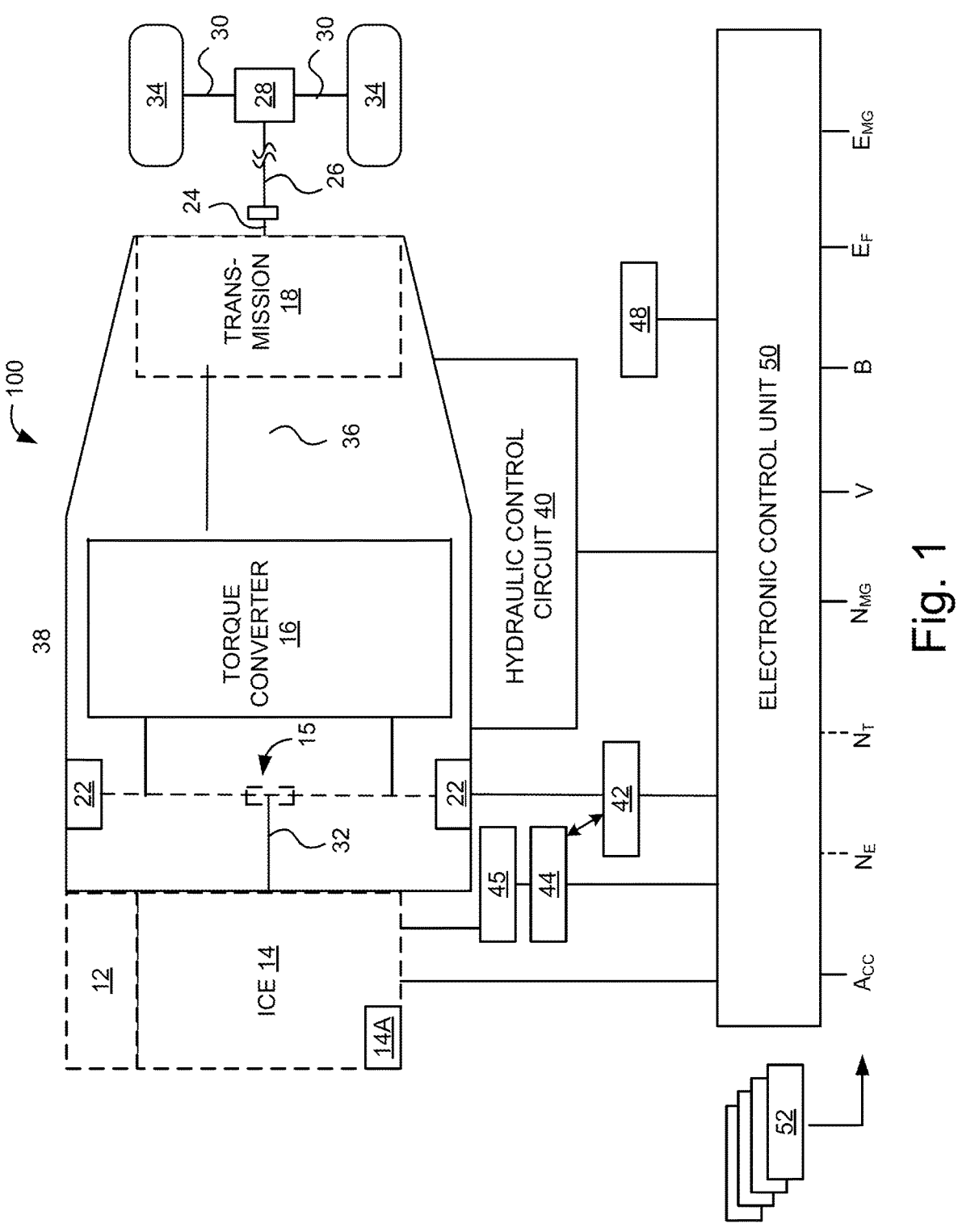
FIG. 1 illustrates an example vehicle with which embodiments of the disclosure may be implemented.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

As referred to herein, computer vision is technology that is related to the acquisition, processing, and analysis of image data, such as digital images and/or video, for the extraction of a high-level and high-dimensional data representing the real-world. Thus, computer is at the core of autonomous vehicles having the capability to recognize objects and surroundings (e.g., pedestrians, road signs, barriers, and other vehicles) in order to safely navigate the road. To ensure robust self-guided navigation for autonomous vehicles, the ability to reconstruct a structure of a scene with high-accuracy is fundamental. Additionally, detecting objects and accurately locating them in a three-dimensional (3D) object space is a key prerequisite for many robotic and autonomous driving tasks.

There is a plethora of applications outside of the realm of autonomous vehicles, including robotics and augmented reality, where detecting and accurately localizing objects in 3D space are crucial components. Hence, monocular 3D detection is an active research area, owing its potentially wide-ranging impact to the ubiquity of cameras. Leveraging exciting recent progress in depth estimation, has led to the emergence of alternative forms of 3D object detectors, such as pseudo-lidar detectors. The strength of pseudo-lidar methods is that they monotonically improve with depth estimation quality (e.g., large scale training of the depth network on raw data). However, regressing depth from single images is inherently an ill-posed inverse problem. Consequently, errors in depth estimation account for a major part of the gap between pseudo-lidar and lidar-based detector. Simpler end-to-end monocular 3D detectors are a promising alternative, although theoretically such models may not enjoy the same scalability benefits of unsupervised pre-training due to their single stage nature. Embodiments of the present disclosure are directed to enhanced end-to-end 3D object detection techniques that facilitate and improve the task of detecting objects in the 3D space from images, such as monocular camera image that may be captured during the operation the autonomous vehicles.

Recent progress in 3D object detection from single images leverages monocular depth estimation as a way to produce 3D point clouds, which turns cameras into pseudo-lidar sensors. These two-stage 3D object detectors improve with the accuracy of the intermediate depth estimation network, which can itself be improved without manual labels via large-scale self-supervised learning. However, these 3D detection approaches tend to suffer from overfitting more than end-to-end methods, are more complex, and the gap with similar lidar-based detectors remains significant. In contrast, the disclosed end-to-end 3D object detection techniques can have a single stage implementation that benefits from depth pre-training like conventional pseudo-lidar methods, but without suffering from their limitations. Furthermore, embodiments of the present disclosure include a dense-depth pre-trained 3D detector, referred to herein as DD3D, which has an architecture that is designed for effective information transfer between depth estimation and 3D detection, allowing the amount of unlabeled pre-training data to be scaled.

Generally, the end-to-end 3D object detection techniques described herein function by associating two-dimensional (2D) features (e.g., output of convolutional network) to instances, which are ultimately associated to 3D bounding boxes that are utilized to detect presence and/or location of objects in a 3D space of images. This association is done by defining criteria between the center of anchor bounding boxes and the coordinates of features extracted from an image by a neural network, such as convolution neural network (CNN). For example, the disclosed end-to-end 3D object detection techniques involve producing a plurality of anchor bounding boxes associated with a target assignment (e.g., associated with presence and/or location of objects within the image) which can be used to produce a match, or an association, to a feature. Furthermore, a center-ness point for each of the anchor boxes can be determined. The association between features and the anchor bounding boxes can be determined using an Intersection-over-union (IOU) criterion based on these determined center-ness points. As a result of the associations, dense depth and 3D bounding boxes can be inferred. Further, the predicted dense depth can be encoded into a 2D feature map, and in turn, the 2D feature map is used as an input to predict the 3D bounding boxes. Accordingly, the end-to-end 3D object detection techniques, as disclosed herein, potentially realize the best of both worlds by having the scalability of pseudo-lidar with raw data and the simplicity and generalization performance of end-to-end 3D detectors. Moreover, the disclosed embodiments achieve a high level of object detection accuracy, with significant improvements compared to previous methods, due to the simplicity and optimization of its end-to-end functionality.

The systems and methods related to the DD3D architecture and end-to-end 3D object detection capabilities, as disclosed herein, may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example autonomous vehicle 100 in which embodiments of the disclosed technology may be implemented is illustrated in FIG. 1. Although the example described with reference to FIG. 1 is a type of autonomous vehicle, the systems and methods described herein can be implemented in other types of vehicles including semi-autonomous vehicles, vehicles with automatic controls (e.g., dynamic cruise control), or other vehicles. Also, the example vehicle 100 described with reference to FIG. 1 is a type of hybrid electric vehicle (HEV). However, this is not intended to be limiting, and the disclosed embodiments can be implemented in other types of vehicles including gasoline- or diesel-powered vehicles, fuel-cell vehicles, electric vehicles, or other vehicles.

According to an embodiment, vehicle 100 can be an autonomous vehicle implementing the DD3D architecture and end-to-end 3D object detection functions, as disclosed herein. As used herein, "autonomous vehicle" means a vehicle that is configured to operate in an autonomous operational mode. "Autonomous operational mode" means that one or more computing systems of the vehicle 100 are used to navigate and/or maneuver the vehicle along a travel route with a level of input from a human driver which varies with the operational mode. As such, vehicle 100 can have a plurality of autonomous operational modes, where each mode correspondingly responds to a controller, for instance electronic control unit 50, with a varied level of automated response. In some embodiments, the vehicle 100 can have an unmonitored autonomous operational mode. "Unmonitored autonomous operational mode" means that one or more computing systems are used to maneuver the vehicle along a travel route fully autonomously, requiring no input or supervision required from a human driver. Thus, as an unmonitored autonomous vehicle 100, responses can be highly, or fully, automated. For example, a controller can be configured to communicate controls so as to operate the vehicle 100 autonomously and safely. After the controller communicates a control to the vehicle 100 operating as an autonomous vehicle, the vehicle 100 can automatically perform the desired adjustments (e.g., accelerating or decelerating) with no human driver interaction. Accordingly, vehicle 100 can operate any of the components shown in FIG. 1 autonomously, such as the engine 14.

Alternatively, or in addition to the above-described modes, vehicle 100 can have one or more semi-autonomous operational modes. "Semi-autonomous operational mode" means that a portion of the navigation and/or maneuvering of the vehicle 100 along a travel route is performed by one or more computing systems, and a portion of the navigation and/or maneuvering of the vehicle 100 along a travel route is performed by a human driver. One example of a semi-autonomous operational mode is when an adaptive cruise control system is activated. In such case, the speed of a vehicle 100 can be automatically adjusted to maintain a safe distance from a vehicle ahead based on data received from on-board sensors, but the vehicle 100 is otherwise operated manually by a human driver. Upon receiving a driver input to alter the speed of the vehicle (e.g., by depressing the brake pedal to reduce the speed of the vehicle), the speed of the vehicle is reduced. Thus, with vehicle 100 operating as a semi-autonomous vehicle, a response can be partially automated. In an example, the controller communicates a newly generated (or updated) control to the vehicle 100 operating as a semi-autonomous vehicle. The vehicle 100 can automatically perform some of the desired adjustments (e.g., accelerating) with no human driver interaction. Alternatively, the vehicle 100 may notify a driver that driver input is necessary or desired in response to a new (or updated) safety control. For instance, upon detecting and locating an object in a 3D space that impacts safety (e.g., using the disclosed end-to-end 3D object detection functions), such as potential collision, vehicle 100 may reduce the speed to ensure that the driver is travelling cautiously. In response, vehicle 100 can present a notification in its dashboard display that reduced speed is recommended or required, because of the safety constraints. The notification allows time for the driver to press the brake pedal and decelerate the vehicle 100 to travel at a speed that is safe.

Additionally, FIG. 1 illustrates a drive system of a vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 100 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 100 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 100 and is powered electrically via a battery 44. Battery 44 may be implemented as one or more batteries or other power storage devices including, for example, lead-acid batteries, lithium-ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, NE, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/ pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information. As will be described in further detail, the sensors 52 can be cameras (or other imaging devices) that are used to obtain image data, such as digital images and/or video. This image data from the sensors 52 can then be processed, for example by the electronic control unit 50, in order to implement the disclosed depth synthesis capabilities disclosed herein. Accordingly, the electronic control unit 50 can execute enhanced computer vision functions, such as depth extrapolation for future timesteps and predicting unseen viewpoints.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
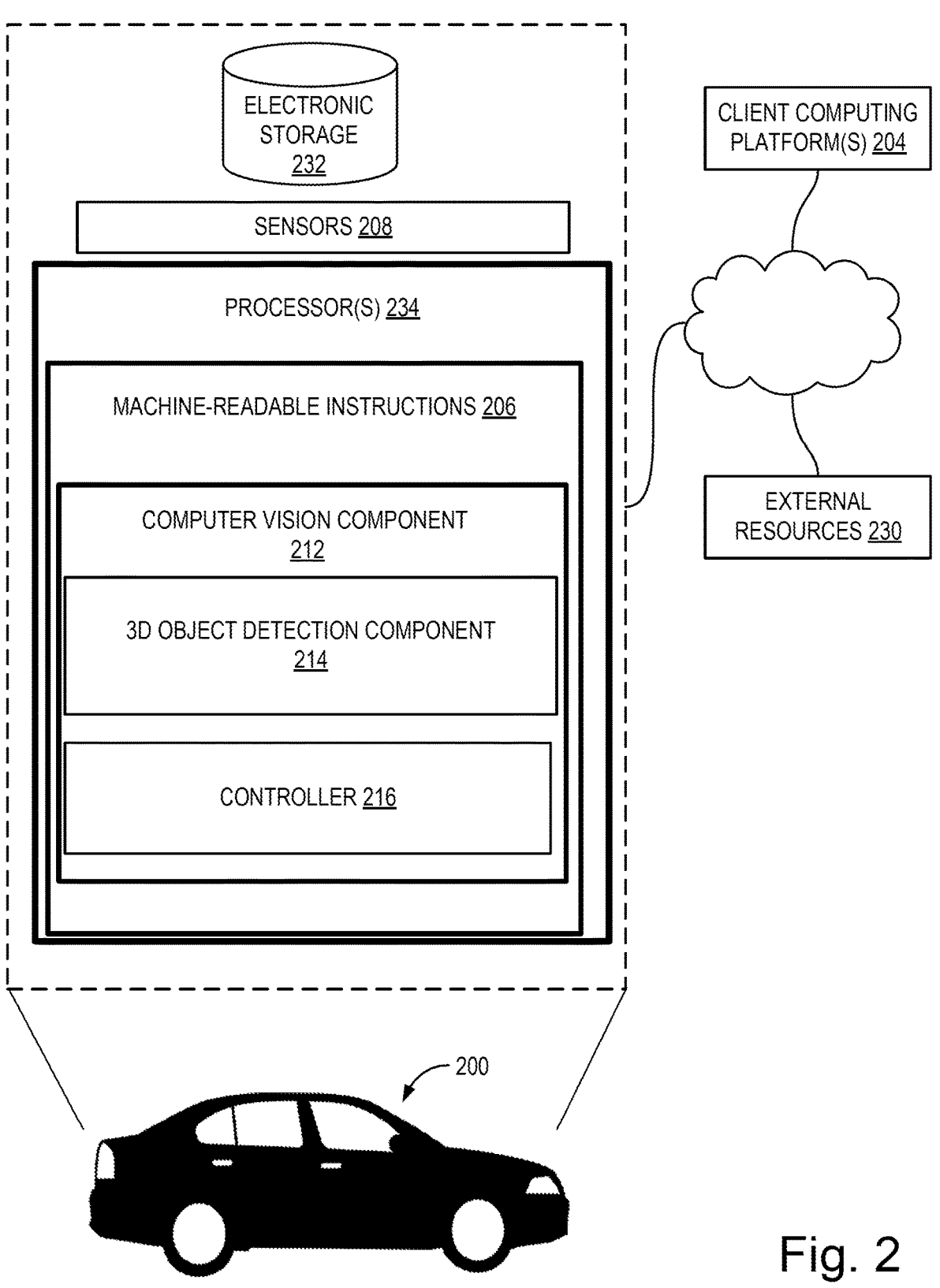
FIG. 2 illustrates an example vehicle configured for partially controlling operation of the vehicle based on the computer vision and end-to-end three-dimensional (3D) object detector capabilities implemented by a Dense Depth pre-trained 3D Detector (DD3D) component, in accordance with one or more implementations disclosed herein.

FIG. 2 illustrates a vehicle 200, for instance an autonomous vehicle, configured for implementing the disclosed DD3D architecture and end-to-end 3D object detection capabilities. In particular, FIG. 2 depicts the vehicle 200 including a DD3D component 214. According to the disclose embodiments, the DD3D component 214 is configured to execute end-to-end 3D object detection, where given an input image (e.g., RGB views from digital images and/or video) including the presence of one or more objects, the component 214 can generate one or more 3D bounding boxes the dense depth predictions that indicate the presence (e.g., depth dimensions, width dimensions, spatial dimensions) and/or location of these objects within the 3D space captured by the image.

In some implementations, vehicle 200 may also include sensors 208, electronic storage 232, processor(s) 234, and/or other components. Vehicle 200 may be configured to communicate with one or more client computing platforms 204 according to a client/server architecture and/or other architectures. In some implementations, users may access vehicle 200 via client computing platform(s) 204.

Sensors 208 may be configured to generate output signals conveying operational information regarding the vehicle. The operational information may include values of operational parameters of the vehicle. The operational parameters of vehicle 100 may include yaw rate, sideslip velocities, slip angles, percent slip, frictional forces, degree of steer, heading, trajectory, front slip angle corresponding to full tire saturation, rear slip angle corresponding to full tire saturation, maximum stable steering angle given speed/friction, gravitational constant, coefficient of friction between vehicle 200 tires and roadway, distance from center of gravity of vehicle 200 to front axle, distance from center of gravity of vehicle 200 to rear axle, total mass of vehicle 200, total longitudinal force, rear longitudinal force, front longitudinal force, total lateral force, rear lateral force, front lateral force, longitudinal speed, lateral speed, longitudinal acceleration, brake engagement, steering wheel position, time derivatives of steering wheel position, throttle, time derivatives of throttle, gear, exhaust, revolutions per minutes, mileage, emissions, and/or other operational parameters of vehicle 200. In some implementations, at least one of sensors 208 may be a vehicle system sensor included in an engine control module (ECM) system or an electronic control module (ECM) system of vehicle 200. In some implementations, at least one of sensors 208 may be vehicle system sensors separate from, whether or not in communication with, and ECM system of the vehicle. Combinations and derivations of information (or of parameters reflecting the information) are envisioned within the scope of this disclosure. For example, in some implementations, the current operational information may include yaw rate and/or its derivative for a particular user within vehicle 100.

In some implementations, sensors 208 may include, for example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, a proximity sensor, global positioning system (or other positional) sensor, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensor (including a blood pressure sensor, pulse oximeter, heart rate sensor, driver alertness sensor, ECG sensor, etc.), degree-of-freedom sensor (e.g. 6-DOF and/or 9-DOF sensors), a compass, and/or other sensors. As used herein, the term "sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of vehicle 200. In some implementations, sensors may also include sensors within nearby vehicles (e.g., communicating with the subject vehicle via V to V or other communication interface) and or infrastructure sensors (e.g., communicating with the subject vehicle via the V2I or other communication interface).

Sensors 208 may be configured to generate output signals conveying visual and/or contextual information. The contextual information may characterize a contextual environment surrounding the vehicle. The contextual environment may be defined by parameter values for one or more contextual parameters. The contextual parameters may include one or more characteristics of a fixed or moving obstacle (e.g., size, relative position, motion, object class (e.g., car, bike, pedestrian, etc.), etc.), number of lanes on the roadway, direction of traffic in adjacent lanes, relevant traffic signs and signals, one or more characteristics of the vehicle (e.g., size, relative position, motion, object class (e.g., car, bike, pedestrian, etc.)), direction of travel of the vehicle, lane position of the vehicle on the roadway, time of day, ambient conditions, topography of the roadway, obstacles in the roadway, and/or others. The roadway may include a city road, urban road, highway, onramp, and/or offramp. The roadway may also include surface type such as blacktop, concrete, dirt, gravel, mud, etc., or surface conditions such as wet, icy, slick, dry, etc. Lane position of a vehicle on a roadway, by way of example, may be that the vehicle is in the far-left lane of a four-lane highway, or that the vehicle is straddling two lanes. The topography may include changes in elevation and/or grade of the roadway. Obstacles may include one or more of other vehicles, pedestrians, bicyclists, motorcyclists, a tire shred from a previous vehicle accident, and/or other obstacles that a vehicle may need to avoid. Traffic conditions may include slowed speed of a roadway, increased speed of a roadway, decrease in number of lanes of a roadway, increase in number of lanes of a roadway, increase volume of vehicles on a roadway, and/or others. Ambient conditions may include external temperature, rain, hail, snow, fog, and/or other naturally occurring conditions.

In some implementations, sensors 208 may include virtual sensors, imaging sensors, depth sensors, cameras, and/or other sensors. As used herein, the term "camera", "sensor" and/or "image sensor" and/or "imaging device" may include any device that captures images, including but not limited to a single lens-based camera, a calibrated camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. The visual information captured by sensors 208 can be in the form of digital images and/or video that includes red, green, blue (RGB) color values representing the image. Information captured by one or more sensors may be marked, time-stamped, annotated, and/or otherwise processed such that information captured by other sensors can be synchronized, aligned, annotated, and/or otherwise associated therewith. For example, contextual information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage, e.g., electronic storage 232, such that captured information may be stored, at least initially, in the integrated embedded storage of a particular vehicle, e.g., vehicle 200. In some implementations, one or more components carried by an individual vehicle may include one or more cameras. For example, a camera may include one or more image sensors and electronic storage media. In some implementations, an image sensor may be configured to transfer captured information to one or more components of the system, including but not limited to remote electronic storage media, e.g. through "the cloud."

Vehicle 200 may be configured by machine-readable instructions 206. Machine-readable instructions 206 may include one or more instruction components. The instruction components may include computer program components. The instruction components may include one or more of: a computer vision component 212; a DD3D component 214; a controller 216, and/or other instruction components.

As a general description, the illustrated components within the machine-readable instructions 206 include the computer vision component 212 and the DD3D component 214. As previously described, the DD3D component 214 is configured to execute enhanced 3D object detection and dense depth prediction in a manner that allows the presence and/or location of objects to be detected in a 3D space with high accuracy. FIG. 2 also shows that the machine-readable instructions 206 includes a computer vision component 212, which is configured to perform the larger breadth of computer vision functions which drive the various autonomous vision and controls utilized by autonomous vehicles. The computer vision component 212 can also be described as implementing the disclosed end-to-end 3D object detection vis-à-vis the DD3D component 214 (the DD3D component 214 is an element of the computer vision component 212). As an example, the DD3D component 214 can implement object detection (in combination with advanced cameras and sensors) in the 3D real world environment, enabling the vehicle 200 to accurately analyze its surroundings and respond with autonomous vehicle controls. The DD3D component 214 ultimately performs its object detection capabilities by executing distinct end-to-end 3D object detection techniques, in accordance with the embodiments. For example, in operation, the DD3D component 214 (e.g., implementing the end-to-end 3D object detection technique) receives an input image (e.g., from on-vehicle camera) that captures a 3D space, where any objects that are physically within the 3D space at time of imaging are also visually captured by the image. The DD3D component 214 can initially define a target assignment for each potential object that is in the image (e.g., based on features extracted from a neural network analysis of the image). Then, a set of anchor boundary boxes can be defined which correspond to a target assignment. The anchor boundary boxes are analyzed to determine center point for each box; and further analyzed to match, or associate, each of the anchor boundary boxes to the extracted features (e.g., output of the neural network in the 2D space). Thereafter, a trained artificial intelligence (AI) model can use these matches, or associations, between the anchor boundary boxes (associated with the target assignments) and features to produce predicted dense depth and 3D bounding boxes. It is the predicted dense depth and 3D bounding boxes which are output by the DD3D component 214 and serve as positive detections of the presence, dimensions, and location of objects in the 3D space. As will be described in further detail herein, the disclosed end-to-end 3D object detection method uses these anchor bounding boxes for a simpler association, or matching, instead of using bounding boxes to also transform the features, which is further processed downstream. Transformation, in addition to further processing the transformed features, requires complex computations that can substantially slow down the process. Moreover, the DD3D component 214 is configured to determine matches between anchor boundary boxes and features by defining criteria between the center of the boxes and the coordinate of features. In an embodiment, an Intersection-over-Union (IoU) criteria is used to determine the matching based on the center-ness points that are found for each of the anchor boundary boxes, which is more robust than simple distance-based matching and achieves great accuracy. Thus, by performing association (or matching) between features and anchor boundary boxes, as opposed to transforming the features, the DD3D component 214 can realize a more efficient end-to-end 3D object detection process that has improved speed without sacrificing accuracy and performance.

Figure 3:
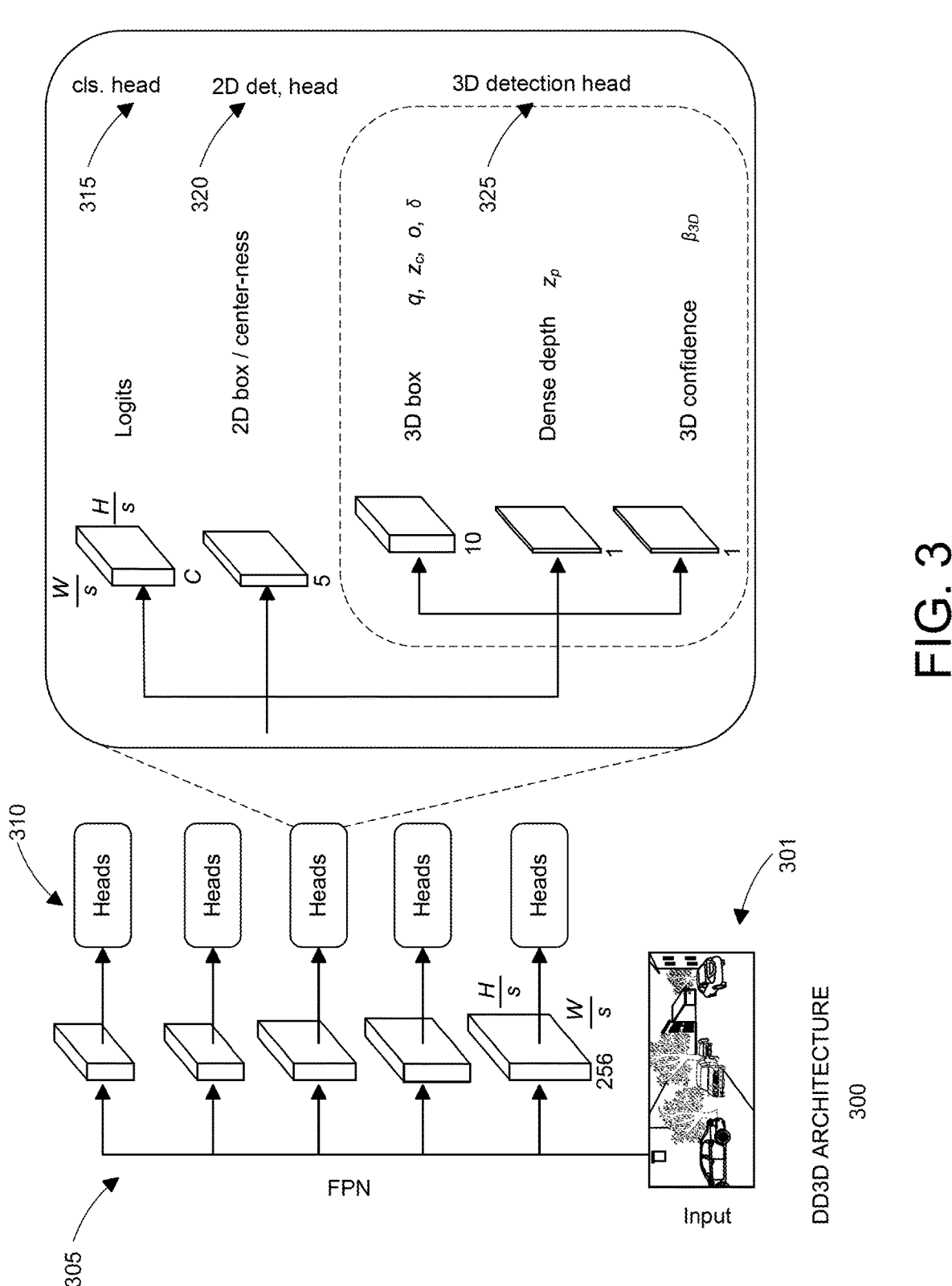
FIG. 3 illustrates an example architecture for the DD3D component of the vehicle depicted in FIG. 2, in accordance with one or more implementations disclosed herein.

Accordingly, the computer vision component 212 and the DD3D component 214 can function in concert with the other components of the vehicle 200, such as sensors 208 (e.g., camera), in order to support vision AI and enhanced computer vision capabilities that can be employed during the autonomous operation of vehicle 200. An example architecture for the DD3D component 214 is depicted in FIG. 3. The associated structure and function of the elements within the DD3D component's 214 architecture are discussed in greater detail in reference to FIG. 3.

Now referring to FIG. 3, an example architecture 300 for the abovementioned DD3D component (shown in FIG. 2) is depicted. The DD3D architecture 300 includes a fully convolutional single-stage network which perform 3D detection and dense depth prediction. Specifically, FIG. 3 illustrates that the framework for the DD3D architecture 300 includes a backbone neural network 305 and multiple sub-networks, shown as heads 310, that are shared among all multi-scale features. FIG. 3 shows that the backbone neural network 305 takes a red-green-blue (RGB) image 301 as input and computes, or otherwise extracts, features from the input image 301 at different scales. For example, the backbone neural network 305 can be a convolution neural network (CNN), where the features are extracted from images and output as convolutional features in the 2D space. The backbone neural network 305 in the example of FIG. 3 particularly implemented as a feature pyramid network (FPN).

Figure 4A:
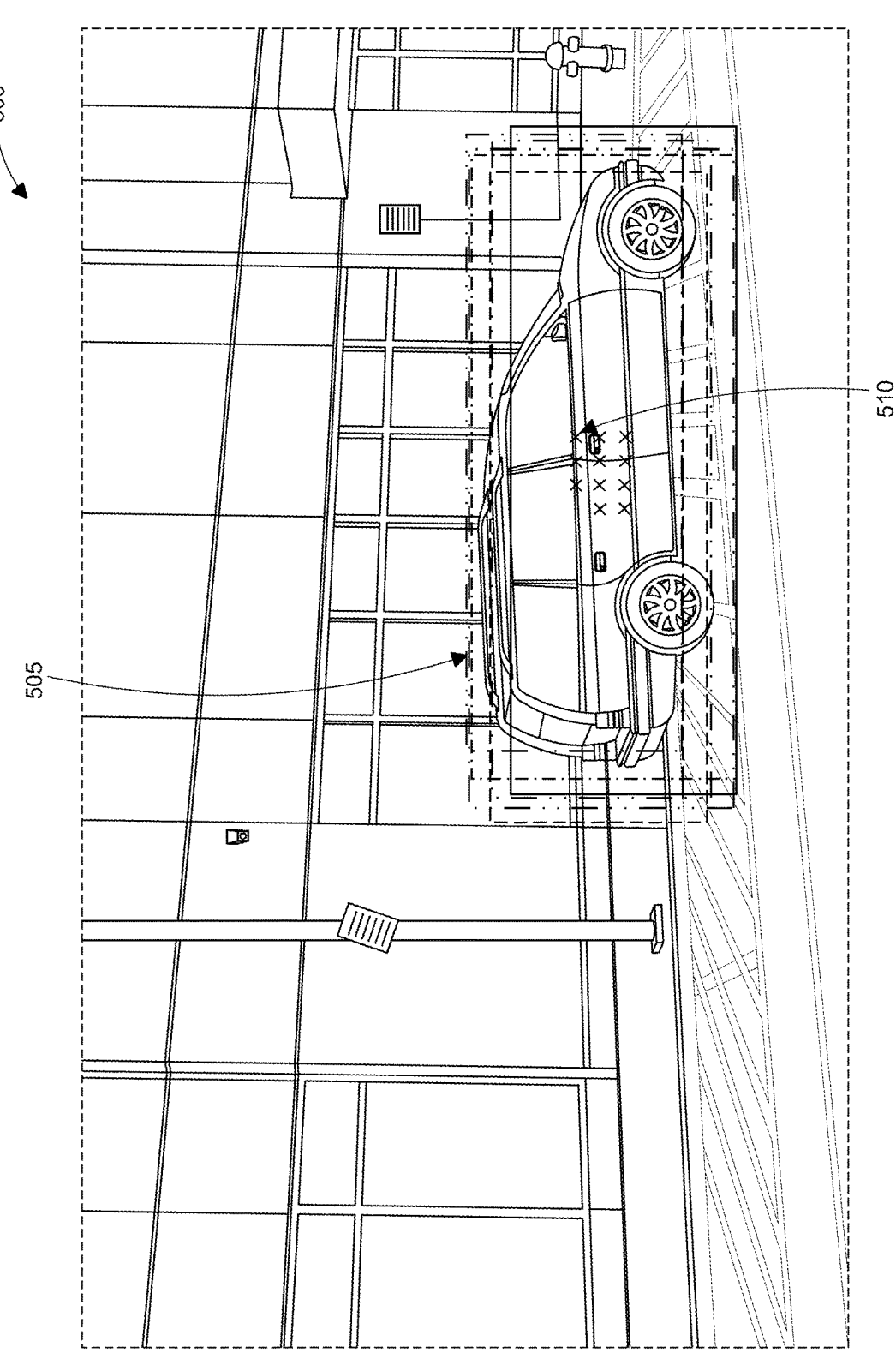
FIG. 4A illustrates examples of anchor bounding boxes and center-ness points that can be defined for an input image implemented by the DD3D architecture depicted in FIG. 3, in accordance with one or more implementations disclosed herein.
Figure 4B:
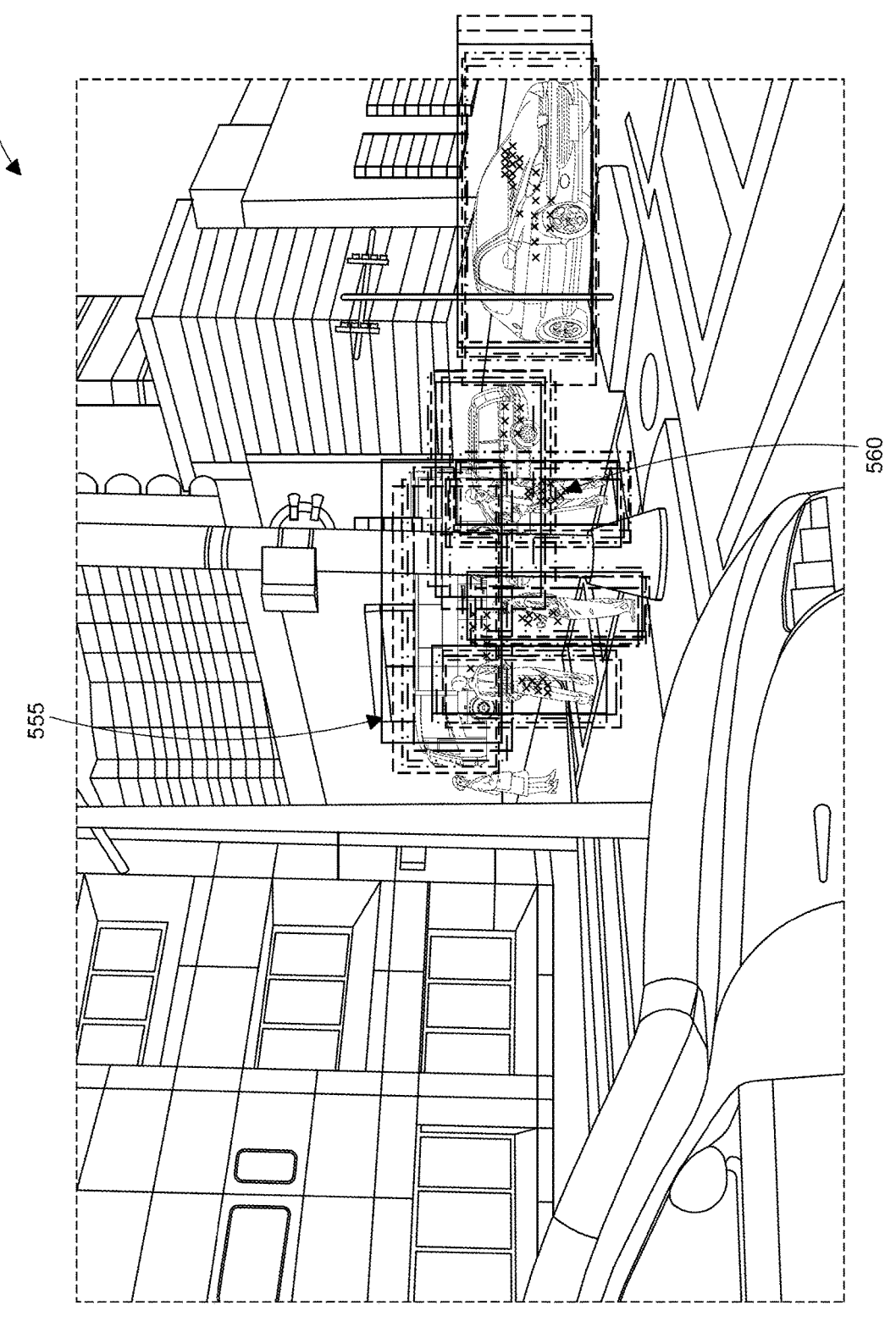
FIG. 4B illustrates examples of a plurality of anchor bounding boxes and a plurality of center-ness points that can be defined for an input image implemented by the DD3D architecture depicted in FIG. 3, in accordance with one or more implementations disclosed herein.

The multiple head networks 310 can be applied to each feature map produced by the backbone neural network 305, which are then used by the other components 315, 320, and 325 of the architecture 300 to perform independent prediction tasks. The DD3D architecture 300 can include a classification component 315 that is configured to predict an object category. The classification component 315 can produces C real values, where C is the number of object categories. The 2D box component 320 of the architecture 300 is configured to produce class-agnostic bounding boxes (also referred to herein as anchor boundary boxes) and determine center-ness points of these boxes based on the extracted features. For example, the 2D box component 320 predicts 4 offsets from the feature location to the sides of each bounding box and a scalar associated with center-ness. FIG. 4A and FIG. 4B illustrate examples of the aforementioned anchor bounding box and center-ness function.

FIG. 4A depicts an image 400 which shows the visual of a real-world 3D space including a vehicle that is parked on a street near a curb. As an example, an autonomous vehicle may need to detect the presence of this parked vehicle as a hazardous object in order to perform autonomous driving controls to avoid a potential collision (e.g., lane change, deceleration) while driving nearby on the roadway. In other words, the parked vehicle can be a target assignment (e.g., based on features in the 2D space) that preliminarily indicate a potential object in the image, which is then subjected to further analysis to predict whether the target assignment indeed corresponds to physical object based on the generation of 3D bounding boxes and predicted dense depth. As seen in FIG. 4A, there a several anchor bounding boxes 405 that have been defined corresponding to the target assignment of the vehicle in the image. In an embodiment, an anchor bounding box 405, which is tied to the 3D space, is defined for each feature that has been extracted from the image in the 2D space. Furthermore, each of anchor bounding boxes 405 has a corresponding center-ness point 410 that is calculated. Thus, FIG. 4A shows that there are multiple center-ness points 410 within the area of the multiple anchor bounding boxes 405, where each center-ness point 410 corresponds to an estimated center for a specific anchor bounding box 405. For example, in FIG. 4A there are 11 defined anchor bounding boxes 405, and similarly a total of 11 determined center-ness points 415, such that each anchor bounding box 405 has its own respective center-ness point 415. Similarly, FIG. 4B depicts an image 450 which shows the visual of another real-world 3D space including a plurality of different objects within the same vicinity on a street. Accordingly, FIG. 4B illustrates that there is a plurality of assigned targets in this image, which represent the respective location of each potential object in the 3D space. Each assigned target has a set of corresponding defined anchor bounding boxes 455 and a plurality of center-ness points 460, where each center-ness point 460 represents the centered of its particularly corresponding box 455.

Referring back to FIG. 3, the DD3D architecture 300 also includes a 3D prediction component 325. The 3D prediction component 325 predicts 3D bounding boxes and dense depth (e.g., per-pixel depth). The prediction component 325 takes features from the backbone neural network 305, which are associated with the 2D as input. The 3D prediction component 325 applies 2D convolutions with 3×3 kernels that generate real values for each feature location. Thus, the features in the 2D (e.g., output of convolutional network) are matched to the defined anchor bounding boxes in the 3D space. This is accomplished by defining criteria between the center-ness points of the anchor bounding boxes and the coordinates of the features. According to the embodiments, the features are matched to the anchor bounding boxes by performing IoU based on their defined center-ness points. The predicted depth is then encoded into a 2D feature map, and used to ultimately predict 3D bounding boxes for a target assignment, indicating the physical presence of the object in the 3D world.

The feature maps are decoded by the 3D prediction component 325 into the 3D bounding boxes, per-pixel depth map, and 3D prediction confidence. Further, the DD3D architecture 300 is designed to use camera focal lengths and thus endows the DD3D architecture 300 with a form of camera-awareness, which allows inference to the depth not only from the input image, but also from the pixel size in a manner that is particularly useful for stable training. Specifically, when the input image 301 is resized during training, the ground-truth 3D bounding box can stay unchanged, but the camera resolution can be modified.

During pre-training, per-pixel depth predictions are used from all FPN levels. The pixels that have valid ground-truth depth from the sparse Lidar point clouds are projected onto the camera plane, and L1 distance from the predicted values are computed. $D_l$ is the predicted depth map from the l-th level in FPN (i.e., interpolated $z_p$), and M is the binary indicator for valid pixels. Training using all FPN levels in the objective, rather than using only the highest resolution features, and thereby enables stable training, especially when training from scratch. The two paths in DD3D architecture 300 from the input image 305 to the 3D bounding box and to the dense depth prediction differ only in the last 3×3 convolutional layer, and thus share nearly all parameters. This allows for effective transfer from the pre-trained representation to the target task. While pre-training, the camera-awareness of the DD3D architecture 300 allows us to use camera intrinsics that are substantially different from the ones of the target domain, while still enjoying effective transfer.

The end-to-end 3D object detection process that is implemented by the DD3D architecture 300 can be described as a two-stage method: first, given an input image it applies a monocular depth network to predict per-pixel depth. The dense depth map is transformed into a 3D point cloud, and then a 3D detector (e.g., lidar-based detector) is used to predict 3D bounding boxes. The modularity of end-to-end 3D object detection process enables quantification of the role of improved depth predictors brought by a large-scale image-LiDAR dataset. The aim of monocular depth estimation is to compute the depth D for each pixel p. To predict 3D bounding boxes from the input image and the estimated depth map, the estimated depth map is first converted into a 3D point cloud and each 3D point is concatenate with the corresponding pixel values. This results in a 6D tensor encompassing colors along with 3D coordinates. For instance, a 2D detector identifies proposal regions in input images, and a 3D detection network is applied to each RoI region of the 6-channel image to produce 3D bounding boxes. Moreover, in an embodiment, the DD3D architecture 300 performs analysis given a single image and its camera intrinsics matrix as input, which achieves monocular 3D detection to generate a set of multi-class 3D bounding boxes relative to camera coordinates.

Figure 5:
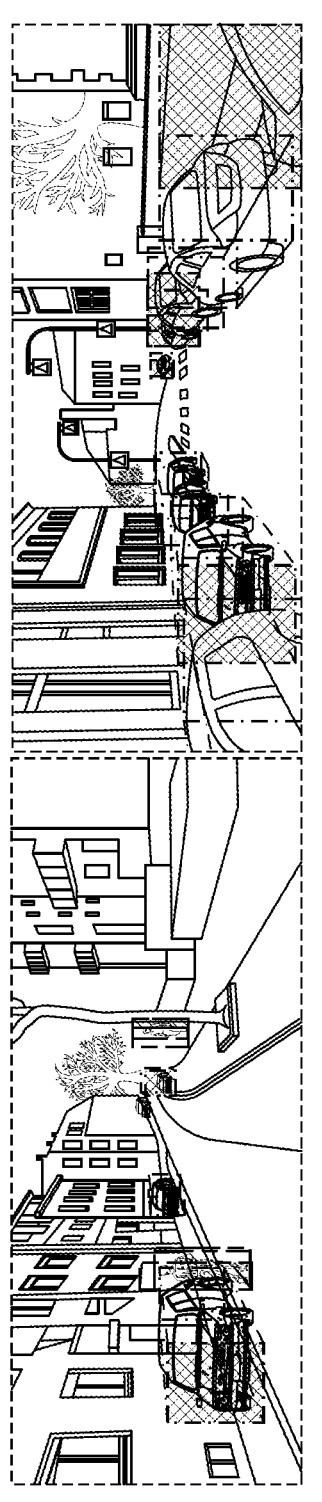
FIG. 5 illustrates examples of visualizations for 3D object detection and dense depth predictions implemented by the DD3D architecture depicted in FIG. 3, in accordance with one or more implementations disclosed herein.
Figure 5:
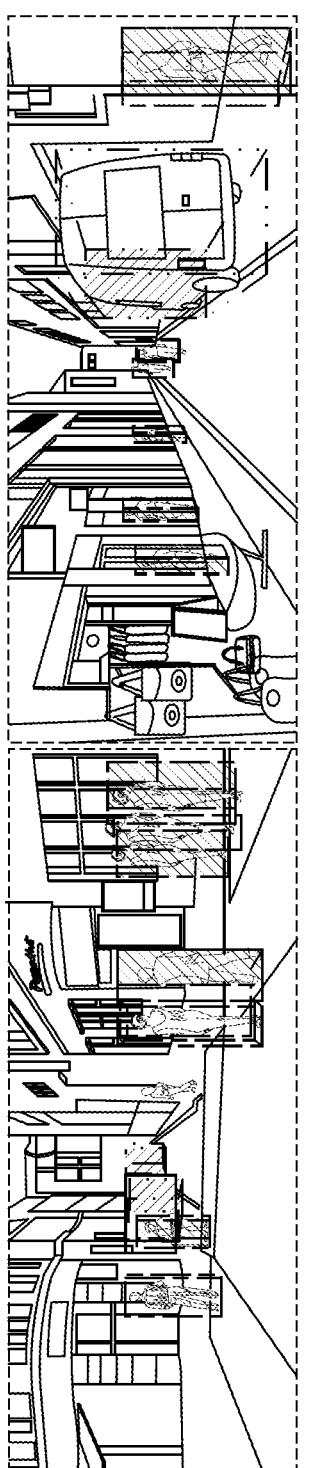
Figure 5:
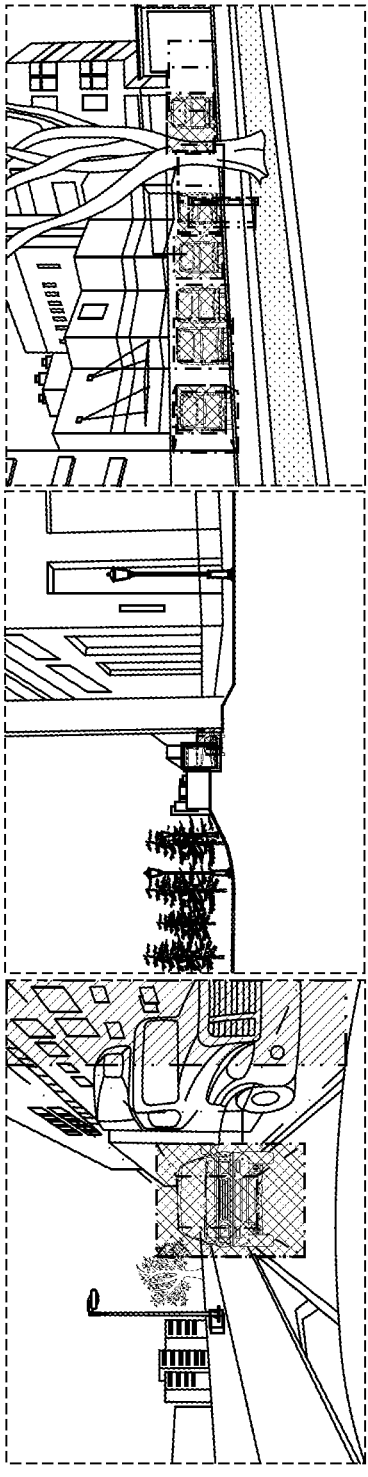

Accordingly, the disclosed DD3D architecture 300 performs monocular 3D object detection and dense depth prediction by implementing the end-to-end 3D detection process that learns a good depth representation via large-scale self-supervised pre-training on raw data, which leads to robust 3D detection. Additionally, as alluded to above, the end-to-end 3D detection process maximizes reuse of pre-trained features in a manner that enables the inference of dense depth and 3D bounding box to share most of the parameters. FIG. 5 depicts example visualizations of the 3D object detection and dense depth prediction that are produced as a result of the DD3D architecture's 300 operation.

Figure 6:
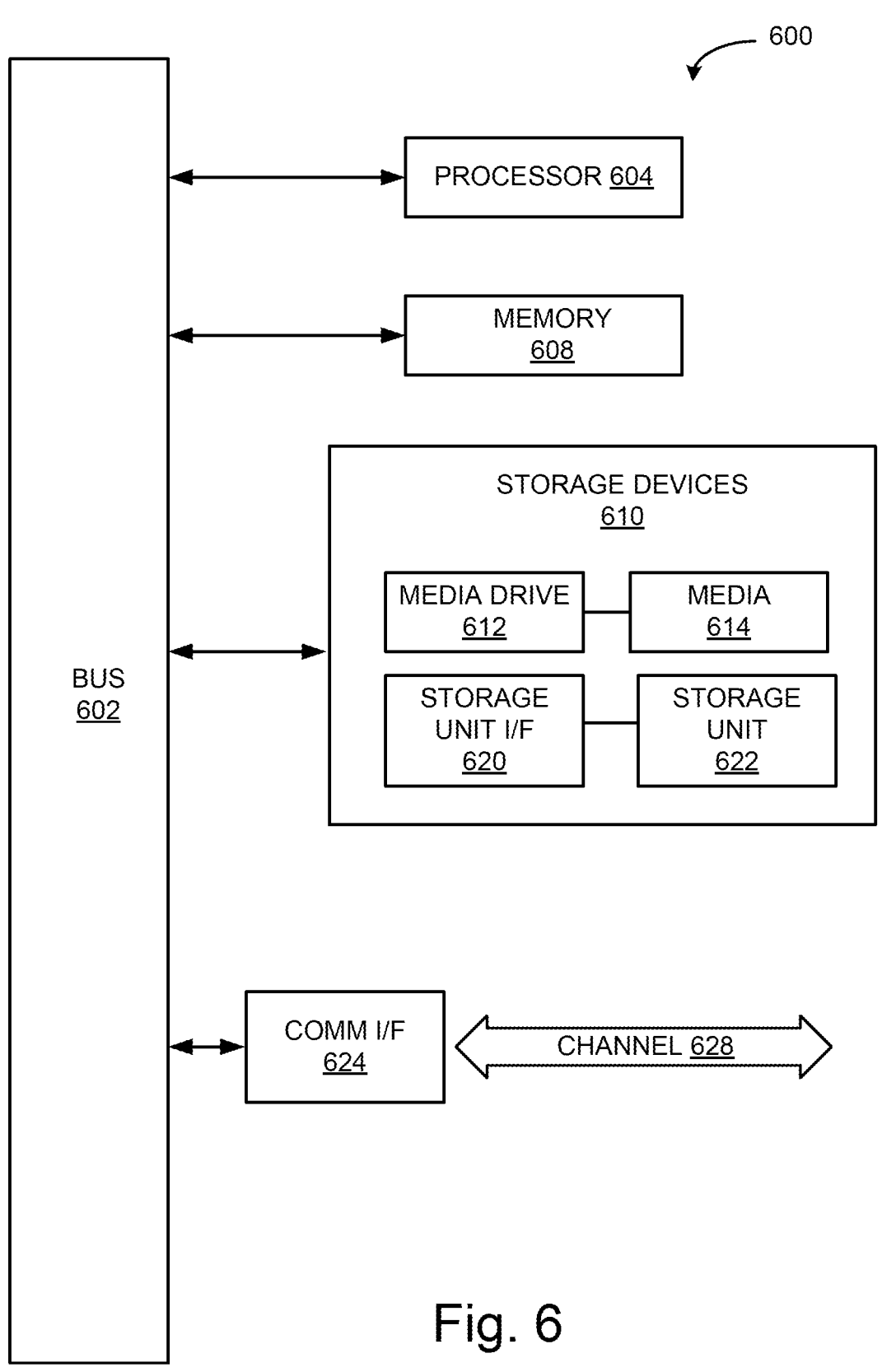
FIG. 6 illustrates an example computing system with which embodiments may be implemented.

As used herein, a circuit or module might be implemented utilizing any form of hardware, software, or a combination thereof. For example, one or more processors, controllers, ASICS, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 6. Various embodiments are described in terms of this example-computing system 600. After reading this description, it will become apparent to a person skilled in the relevant art how to implement the technology using other computing systems or architectures.

Referring now to FIG. 6, computing system 600 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 600 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 600 might include, for example, one or more processors, controllers, control modules, or other processing devices, such as a processor 604. Processor 604 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 604 is connected to a bus 602, although any communication medium can be used to facilitate interaction with other components of computing system 1000 or to communicate externally.

Computing system 600 might also include one or more memory modules, simply referred to herein as main memory 608. For example, in some embodiments random access memory (RAM) or other dynamic memory, might be used for storing information and instructions to be executed by processor 604. Main memory 608 might also be used for storing temporary variables or other intermediate information during execution of instructions to be executed by processor 604. Computing system 600 might likewise include a read only memory ("ROM") or other static storage device coupled to bus 602 for storing static information and instructions for processor 604.

The computing system 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), a flash drive, or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing system 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a flash drive and associated slot (for example, a USB drive), a PCMCIA slot and card, and other fixed or removable storage units 622 and interfaces 620 that allow software and data to be transferred from the storage unit 622 to computing system 600.

Computing system 600 might also include a communications interface 624. Communications interface 624 might be used to allow software and data to be transferred between computing system 600 and external devices. Examples of communications interface 624 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 1000 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle, comprising:
one or more processors detecting one or more objects in a three-dimensional (3D) space of a surrounding environment for the vehicle by predicting:
a dense depth associated with one or more target assignments corresponding to a location of the one or more objects within an image of the 3D space, and
3D bounding boxes associated with the one or more target assignments by encoding the predicted dense depth to a two-dimensional (2D) feature map, wherein the one or more processors predict the 3D bounding boxes based on the 2D feature map; and
a controller receiving the detection of the one or more objects in the 3D space from the one or more processors and performing one or more autonomous vehicle operations.

2. The vehicle of claim 1, wherein the one or more processors comprise a Dense Depth-pre-trained 3D Detector (DD3D) component.

3. The vehicle of claim 1, wherein the one or more processors predict the 3D bounding boxes and the dense depth by extracting features associated with the image using a neural network.

4. The vehicle of claim 3, wherein the one or more processors predict the 3D bounding boxes and the dense depth further by defining a plurality of anchor bounding boxes associated with each of the one or more target assignments within the image.

5. The vehicle of claim 4, wherein the one or more processors determine a center-ness point for each of the plurality of anchor bounding boxes.

6. The vehicle of claim 5, wherein the one or more processors predict the 3D bounding boxes and the dense depth further by determining an association between each of the plurality of anchor bounding boxes and the extracted features.

7. The vehicle of claim 6, wherein the one or more processors determine the association between each of the plurality of anchor bounding boxes and the extracted features using intersection-over-union (IOU) based on the determined center-ness points.

8. The vehicle of claim 1, wherein the image comprises a monocular image and detecting the one or more objects in the 3D space comprises monocular 3D object detection.

9. The vehicle of claim 1, wherein the one or more processors comprise a computer vision component performing one or more computer visual capabilities for the one or more autonomous vehicle operations.

10. The vehicle of claim 1, wherein the vehicle comprises an autonomous vehicle.

11. A system, comprising:
a backbone neural network component extracting features associated with one or more objects in an image of a three-dimensional (3D) space; and
a 3D detection component predicting:
a dense depth associated with the one or more objects in the 3D space; and
3D bounding boxes corresponding to a location of the one or more objects within the image of the 3D space, wherein the 3D bounding boxes are predicted based on the extracted features and by encoding the predicted dense depth to a two-dimensional (2D)

feature map, wherein the one or more processors predict the 3D bounding boxes based on the 2D feature map.

12. The system of claim 11, wherein the 3D detection component generates a 3D object detection based on the predicted 3D bounding boxes.

13. The system of claim 12, further comprising a 2D component defining a plurality of anchor bounding boxes associated with each of the one or more objects within the image of the 3D space and determining a center-ness point for each of the plurality of anchor bounding boxes.

14. The system of claim 13, wherein the 3D detection component predicts the 3D bounding boxes based on associations between each of the plurality of anchor bounding boxes and the extracted features using the determined center-ness points.

15. The system of claim 11, wherein the 3D detection component predicts the 3D bounding boxes based on the 2D feature map.

16. The system of claim 11, wherein the system performs one or more autonomous vehicle operations based on the predicted 3D bounding boxes and dense depth.

17. A non-transitory computer-readable medium having executable instructions stored thereon that, when executed by one or more processors, cause the one or more processors to perform operations, the operations comprising:

extracting features associated with one or more objects in an image of a three-dimensional (3D) space;

predicting a dense depth associated with the one or more objects in the 3D space; and predicting 3D bounding boxes corresponding to a location of the one or more objects within the image of the 3D space, wherein the 3D bounding boxes are predicted based on the extracted features and by encoding the predicted dense depth to a two-dimensional (2D) feature map, wherein the one or more processors predict the 3D bounding boxes based on the 2D feature map.

18. The non-transitory computer-readable medium of claim 17, wherein the operations further comprise:

defining a plurality of anchor bounding boxes associated with each of the one or more objects within the image of the 3D space and determining a center-ness point for each of the plurality of anchor bounding boxes.

19. The non-transitory computer-readable medium of claim 18, wherein predicting the 3D bounding boxes is based on associations between each of the plurality of anchor bounding boxes and the extracted features using the determined center-ness points.

20. The non-transitory computer-readable medium of claim 17, wherein the operations further comprise defining a plurality of anchor bounding boxes associated with each of the one or more objects within the image.

21. The non-transitory computer-readable medium of claim 20, wherein the operations further comprise determining a center-ness point for each of the plurality of anchor bounding boxes.

22. The non-transitory computer-readable medium of claim 21, wherein predicting the 3D bounding boxes and the dense depth further comprises determining an association between each of the plurality of anchor bounding boxes and the extracted features.

23. The non-transitory computer-readable medium of claim 22, wherein the association is determined using intersection-over-union (IOU) based on the determined center-ness points.

24. The non-transitory computer-readable medium of claim 17, wherein the operations further comprise predicting the 3D bounding boxes based on the two-dimensional (2D) feature map.

25. The non-transitory computer-readable medium of claim 17, wherein the image comprises a monocular image and the predicting comprises monocular 3D object detection.

26. The non-transitory computer-readable medium of claim 17, wherein the instructions, when executed, cause the one or more processors to perform one or more autonomous vehicle operations based on the predicted 3D bounding boxes and dense depth.

\*    \*    \*    \*    \*